Oct. 20, 1925.
B. D. THOMAS
TAIL SKID FOR AIRPLANES
Filed July 11, 1922
1,558,063
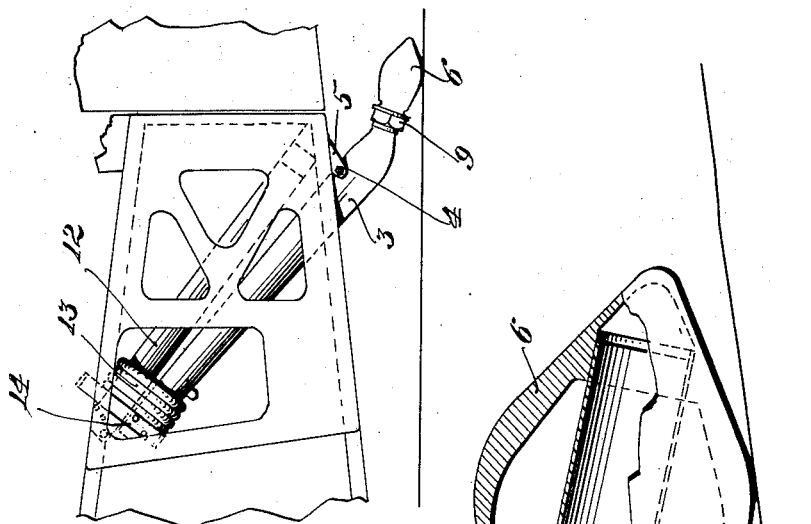
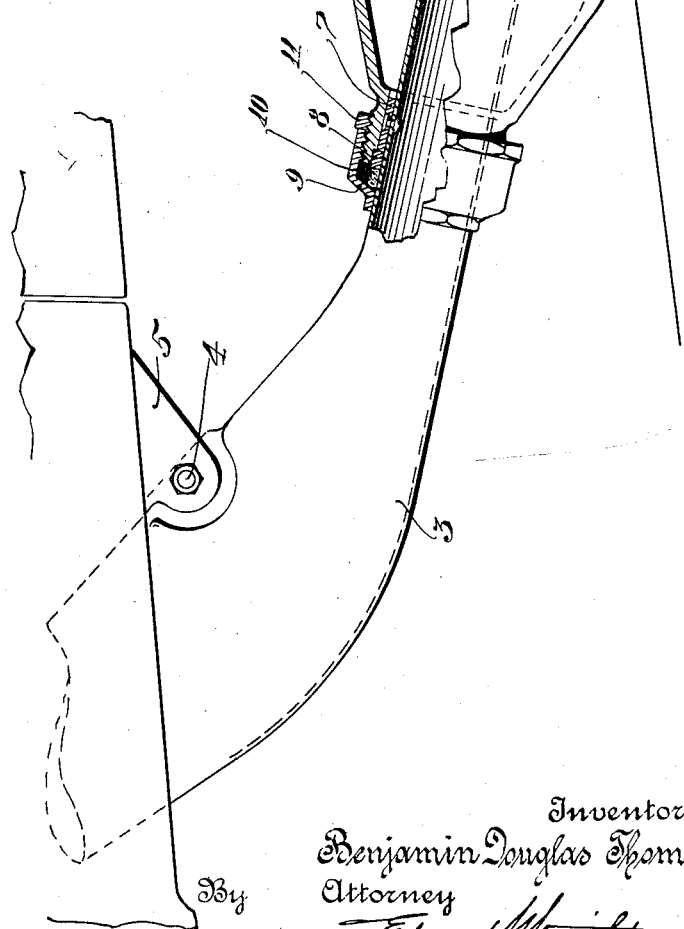
Inventor
Benjamin Douglas Thomas
By Attorney
Edward Wright Patented Oct. 20, 1925.

1,558,063

UNITED STATES PATENT OFFICE.

BENJAMIN DOUGLAS THOMAS, OF ITHACA, NEW YORK, ASSIGNOR OF ONE-TENTH TO THOMAS-MORSE AIRCRAFT CORPORATION, OF ITHACA, NEW YORK, A CORPORATION OF NEW YORK.

TAIL SKID FOR AIRPLANES.

Application filed July 11, 1922. Serial No. 574,140.

*To all whom it may concern:*

Be it known that I, BENJAMIN DOUGLAS THOMAS, a subject of the King of Great Britain, residing at Ithaca, in the county of Tompkins and State of New York, have invented a certain new and useful Improvement in Tail Skids for Airplanes, of which improvement the following is a specification.

This invention relates to tail skids for airplanes, and has for its principal object to provide a tail skid which is substantially rigid against lateral movement, and, at the same time, relieves the rear portion of the fuselage from severe transverse stresses such as set up by lateral movement of the rear end when the skid is in contact with the ground.

With this object in view, my invention comprises a tail skid, provided at its rear end with a swivel shoe which is free to rotate on the skid and roll upon the ground under a lateral movement of the rear end of the fuselage. As shown and preferably, the tail skid is mounted on a hinge so that it can swing vertically, and is provided with elastic shock absorbers to limit the vertical deflection, while it is maintained substantially rigid against lateral movement.

In the accompanying drawing: Figure 1 is an elevation of the end of a tail skid showing one form of swivel shoe partly in section, and embodying my improvement; and Fig. 2, a side elevation, on a smaller scale, showing the mounting of the tail skid.

According to the construction shown, the tail skid, 3, which may be of steel or other strong material, is mounted to swing vertically upon the hinge joint or axis, 4, on a bracket, 5, rigidly attached to the rear end of the frame or fuselage, and at the rear end of the skid is rotatably mounted the shoe, 6, adapted to roll upon the ground during lateral movement of the tail skid. While the tail skid shoe, 6, may be of any suitable shape and material, it is preferred to form the same of circular cross section, somewhat resembling a double cone tapering from the middle toward opposite ends, and to make it of manganese bronze or other wear resisting material.

The rear end of the tail skid is preferably made cylindrical in cross section, and is provided with bearings for the shoe, 6, at opposite ends of the cylindrical portion, that at the forward end being formed with a bushing, 7, riveted to the tubing, and having a thrust collar, 8, mounted on the tubing in advance of the bushing. A gland nut, 9, is screwed upon a forward extension, of the shoe, and a packing, 10, is inserted between said nut and the forward end of the extension. A lock nut, 11, locks the gland nut in position. This packing serves as a cushion in case of shocks tending to pull the shoe off the skid, and also to prevent leakage of oil or grease which may be put into the hollow central portion of the tail skid shoe, 6, before mounting it on the tail skid, for the purpose of lubricating the bearings.

The tail skid may be connected to the fuselage or frame by various forms of shock absorbers, but as shown in Fig. 2, the diagonal tubular member, 12, is rigidly attached to the fuselage at its upper and lower ends, and carries the bracket, 5, on which the tail skid is hinged. The shock absorber, in the form of elastic bands, 13, is wound around the upper ends of the tail skid, and the tubular member. A slotted guard, 14, may be fastened at the upper end of the tail skid and extend around the tubular member for guiding the tail skid in its vertical swinging movement in which it is restricted and cushioned by the shock absorber cord, 13.

It will be apparent that my invention is not limited to any specific form of mounting of the tail skid as the improved swivel shoe may be applied to various types of tail skids.

By means of my improvement the tail skid is substantially rigid against lateral movement, but does not subject the rear portion of the fuselage to severe lateral strains, since the swivel shoe is free to roll laterally over the ground while the tail skid is adapted to swing vertically upon its axis subject to the restriction of the shock absorber.

This also eliminates any tendency to deflect the airplane from its course prior to taking off, or in landing, particularly where the field is rough.

It will also be seen that my improved swivel shoe has the additional advantage that the bearing surface is much greater than with the fixed type, as due to the swivel action the entire circumference is available for wear. When this part becomes worn, it is only necessary to renew the tail skid shoe.

Having now described my invention, what I claim as new and desire to secure by Letters Patent is:

1. A tail skid having a cylindrical rear end provided with bearings, and a shoe mounted on said bearings for rotation only in planes transverse to the general direction of the tail skid.

2. A tail skid having cylindrical bearings on its rear end, and a swivel shoe of circular cross section and tapering ends mounted on said bearings.

3. A tail skid having a bearing, and a hollow swivel shoe, containing a lubricant chamber, mounted to rotate on said bearing transversely to the longitudinal direction of the tail skid.

4. A tail skid having a bearing, a swivel shoe mounted on said bearing, a gland nut, and a packing between said nut and the forward end of said shoe.

5. In an airplane, a tail skid the rear end of which is cylindrical in cross section, bearings on each end of said cylindrical portion, a hollow shoe of double truncated cone shape mounted to rotate on said bearings transversely to the axis of said cylindrical portion, and means at the forward end of said shoe to prevent leakage of lubricant from the interior thereof.

6. In an airplane, a tail skid pivotally mounted for vertical oscillation relatively to the fuselage but sustained against lateral movement, spaced bearings on the rear end of said skid, a hollow shoe mounted to rotate on said bearings transversely to the longitudinal axis of the airplane, and means to maintain the interior of said shoe tightly closed.

7. A tail skid for airplanes having its rear end cylindrical in cross section, forward and aft bearings on said cylindrical portion, a shoe, cylindrical in cross section and having tapering ends, rotatably carried on said bearings, and adjustable means to secure said shoe in place.

In testimony whereof I have hereunto set my hand.

BENJAMIN DOUGLAS THOMAS.